US010575090B2

(12) United States Patent
Kim et al.

(10) Patent No.: US 10,575,090 B2
(45) Date of Patent: Feb. 25, 2020

(54) SOUND COLLECTING TERMINAL, SOUND PROVIDING TERMINAL, SOUND DATA PROCESSING SERVER, AND SOUND DATA PROCESSING SYSTEM USING THE SAME

(71) Applicant: SNU R&DB FOUNDATION, Seoul (KR)

(72) Inventors: Suhwan Kim, Seoul (KR); Seyun Kim, Seoul (KR); Minjae Kim, Jeonju-si (KR)

(73) Assignee: SNU R&DB FOUNDATION, Seoul (KR)

( * ) Notice: Subject to any disclaimer, the term of this patent is extended or adjusted under 35 U.S.C. 154(b) by 110 days.

(21) Appl. No.: 15/548,885

(22) PCT Filed: Jan. 27, 2016

(86) PCT No.: PCT/KR2016/000840
§ 371 (c)(1),
(2) Date: Aug. 4, 2017

(87) PCT Pub. No.: WO2016/126039
PCT Pub. Date: Aug. 11, 2016

(65) Prior Publication Data

US 2018/0027324 A1 Jan. 25, 2018

(30) Foreign Application Priority Data

Feb. 4, 2015 (KR) ........................ 10-2015-0017367

(51) Int. Cl.
*G06F 17/00* (2019.01)
*H04B 3/00* (2006.01)
(Continued)

(52) U.S. Cl.
CPC ................. *H04R 1/40* (2013.01); *H04R 1/08* (2013.01); *H04R 1/326* (2013.01); *H04R 3/005* (2013.01)

(58) Field of Classification Search
CPC . H04R 1/08; H04R 1/40; H04R 1/326; H04R 1/406; H04R 3/005; H04R 2430/20;
(Continued)

(56) References Cited

U.S. PATENT DOCUMENTS 10,107,639 B2 * 10/2018 Khawand ........... G01C 21/3629
2005/0216258 A1 * 9/2005 Kobayashi .............. H04M 3/56
704/205

(Continued)

FOREIGN PATENT DOCUMENTS

JP 2001-144669 A 5/2001
KR 10-2003-0046727 A 6/2003

(Continued)

OTHER PUBLICATIONS

International Search Report for PCT/KR2016/000840 dated May 24, 2016 from Korean Intellectual Property Office.

*Primary Examiner* — Xu Mei
(74) *Attorney, Agent, or Firm* — Paratus Law Group, PLLC

(57) ABSTRACT

A sound data processing system includes a plurality of sound collecting terminals and a server, wherein each of the plurality of sound collecting terminals and each of the plurality of sound providing terminals includes a sound collecting means that collects a sound while having a position and an orientation direction, a sound providing means that provides a sound while having an orientation direction, a position detecting means that detects the positions of the sound collecting means and the sound providing means, a direction detecting means that detects the orientation directions, and a communication module that transmits (Continued)

sound data corresponding to the sound collected by the sound collecting means and supplementary data including position data corresponding to the position detected by the position detecting means and orientation direction data corresponding to the orientation direction detected by the direction detecting means and through a network.

9 Claims, 13 Drawing Sheets

(51) Int. Cl.

| | |
|---|---|
| ***H04R 3/00*** | (2006.01) |
| ***H04R 1/40*** | (2006.01) |
| ***H04R 1/08*** | (2006.01) |
| ***H04R 1/32*** | (2006.01) |

(58) Field of Classification Search
CPC . H04R 2430/21; H04R 2430/23; G06F 17/00; G06F 17/3074; G06F 17/30743
USPC ........................... 381/77, 79–82, 91, 92, 122
See application file for complete search history.

(56) References Cited

U.S. PATENT DOCUMENTS

2006/0034469 A1* 2/2006 Tamiya .................. H04M 3/56 381/97
2010/0223552 A1* 9/2010 Metcalf .................. H04S 3/008 715/716
2010/0281984 A1 11/2010 Ko
2012/0310396 A1* 12/2012 Ojanpera .............. H04R 1/406 700/94
2013/0315034 A1* 11/2013 Yagihashi ................ H04R 1/32 367/103
2015/0189455 A1* 7/2015 Donaldson .............. H04R 1/20 381/77

FOREIGN PATENT DOCUMENTS

KR 10-0722800 B1 5/2007
KR 10-2009-0078604 A 7/2009
KR 10-2011-0109620 A 10/2011

* cited by examiner

SOUND COLLECTING TERMINAL, SOUND PROVIDING TERMINAL, SOUND DATA PROCESSING SERVER, AND SOUND DATA PROCESSING SYSTEM USING THE SAME

CROSS REFERENCE TO PRIOR APPLICATIONS

This application is a National Stage Patent Application of PCT International Patent Application No. PCT/KR2016/000840 (filed on Jan. 27, 2016) under 35 U.S.C. § 371, which claims priority to Korean Patent Application No. 10-2015-0017367 (filed on Feb. 4, 2015), which are all hereby incorporated by reference in their entirety.

TECHNICAL FIELD

Embodiments of the present disclosure relate to a sound collecting terminal, a sound providing terminal, a sound data processing server, and a sound data processing system using the same.

BACKGROUND ART

Sound is a longitudinal wave consisting of a dense phase formed by relative compression of air, which is a medium, and a sparse phase in which air is relatively expanded, and is converted into an electrical signal using a microphone. Sound converted into an electrical signal is analog and/or digital signal processed, amplified using a power amplifier to obtain a desired volume, and then supplied to the outside through a speaker. Conventional sound data processing systems only collect sound using a microphone, process the collected sound, and provide the sounds to the outside.

DISCLOSURE

Technical Problem

A prior art focuses on transmitting and receiving sound data and restoring sound from the sound data such as processing and transmitting sound collected using a microphone and restoring the sound. Therefore, according to the prior art, an embodiment of finding a position of a source producing sound from collected sound data or erasing the sound generated by the source is limited.

The present disclosure is directed to providing a sound data processing system which may determine a position of a source collecting and producing sound, generate an alarm when a specific event is generated, eliminate noise emitted in a specific direction, and perform public address and a remote call, and a terminal and a server used for the same.

Technical Solution

To address the above-described problems, the present disclosure provides a sound data processing system including: a plurality of sound collecting terminals; and a server, wherein each of the plurality of sound collecting terminals includes a sound collecting means that collects a sound and has an orientation direction, and a communication module that transmits sound data corresponding to the sound collected by the sound collecting means and supplementary data including position data of a position of a corresponding sound collecting terminal and orientation direction data corresponding to the orientation direction of the sound collecting means via a network, and the server receives the sound data and the supplementary data transmitted by the plurality of sound collecting terminals through the network, and determines a position of a source that emits the sound collected by the sound collecting means on the basis of the sound data and the supplementary data.

The present disclosure also provides a sound collecting terminal including: a sound collecting means that collects a sound and has an orientation direction; and a communication module that transmits sound data corresponding to the sound collected by the sound collecting means and supplementary data including position data of a position of the sound collecting terminal and orientation direction data corresponding to the orientation direction of the sound collecting means via a network, wherein the supplementary data is transmitted when there is a change in the position or the orientation direction, or is intermittently transmitted, and the sound data and the supplementary data are transmitted to the same server.

The present disclosure also provides a sound data processing server including: a communication unit that receives, from a network, sound data corresponding to sound collected by a plurality of sound collecting means supplementary data including a plurality of pieces of position data corresponding to positions of a plurality of sound collecting means and a plurality of pieces of orientation direction data corresponding to orientation directions of the plurality of sound collecting means; a storage device that stores the supplementary data and the sound data; and a calculating unit that determines a position of a source emitting the collected sound on the basis of the sound data and the supplementary data.

The present disclosure also provides a sound data processing system including: a plurality of sound providing terminals; and a sever, wherein each of the plurality of sound providing terminals includes a sound providing means that provides a sound to a target position and has an orientation direction, and a communication module that transmits supplementary data including position data of a current position of a corresponding sound providing terminal and orientation direction data corresponding to the orientation direction of the sound providing means through a network, and receives sound data corresponding to a sound provided by the sound providing means from the network, and the server receives the supplementary data transmitted by the plurality of sound providing terminals through the network, and transmits the sound data through the network so that the sound providing terminals provide the sound to the target position on the basis of the supplementary data.

The present disclosure also provides a sound providing terminal including: a sound providing means that provides a sound to a target position and has an orientation direction; and a communication module that transmits supplementary data including position data corresponding to a position detected by a position detecting means and orientation direction data corresponding to an orientation direction detected by a direction detecting means through a network, and receives sound data corresponding to the sound provided by the sound providing means from the network, wherein the supplementary data is transmitted when there is a change in the position or the orientation direction or is intermittently transmitted, and a server transmitting the sound data is the same as a server receiving the supplementary data.

The present disclosure also provides a sound data processing server including: a communication unit that receives, from a network, supplementary data including a plurality of pieces of position data corresponding to positions of a plurality of sound providing terminals providing a sound to a target region and a plurality of pieces of orientation direction data corresponding to orientation directions of a plurality of sound providing means, and transmits sound data corresponding to sound provided by a plurality of sound collecting means; a storage device that stores the supplementary data and the sound data; and a calculating unit that determines a sound providing terminal providing the sound to the target region on the basis of the supplementary data.

Advantageous Effects

According to embodiments of the present embodiment, it is possible to easily determine a position of a source producing sound from sound data formed by using a plurality of sound collecting terminals collecting the sound, and positions and orientation directions of the plurality of sound collecting terminals.

Also, according to embodiments of the present embodiment, it is possible to form an attenuation sound signal capable of erasing sound from sound data formed by using a plurality of sound collecting terminals collecting the sound, and positions and orientation directions of the plurality of sound collecting terminals, and provide the formed attenuation sound signal to a sound providing means to attenuate the sound.

Also, according to embodiments of the present embodiment, a plurality of sound providing terminals may provide a specific sound to a target position to perform a remote call between remote places or perform public address.

MODES OF THE INVENTION

Figure 1:
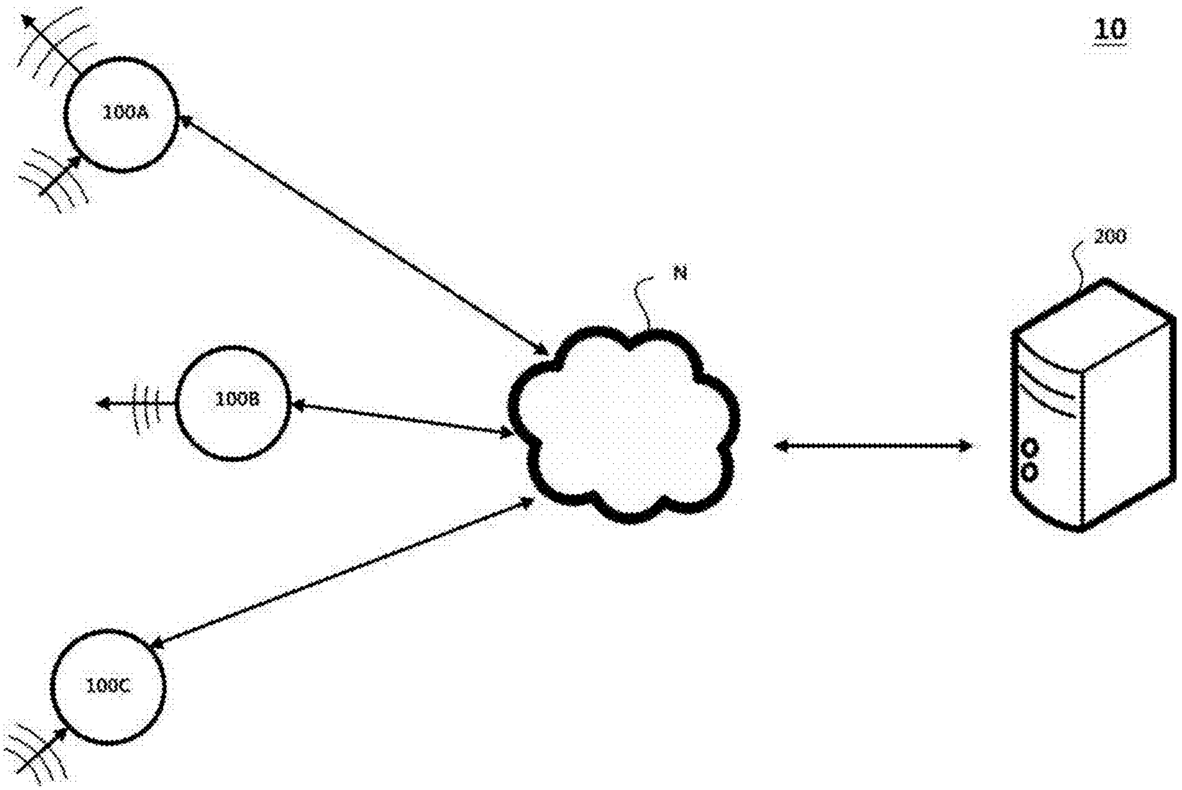
FIG. 1 is a schematic diagram for explaining a sound data processing system according to an embodiment of the present disclosure.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as “first” and “second,” etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

A singular expression includes a plural expression unless clearly indicated otherwise in context. In this application, the terms “include” or “have” are for designating that features, numbers, steps, operations, elements, parts described in this specification or combinations thereof exist and are not to be construed as excluding the presence or possibility of adding one or more other features, numbers, steps, operations, elements, parts, or combinations thereof.

The respective steps may be changed from a mentioned order unless specifically mentioned in context. Namely, respective steps may be performed in the same order as described, may be substantially simultaneously performed, or may be performed in reverse order.

The expression “and/or” used to describe the embodiments of the present disclosure is used to refer to each and every one. As an example, the description of “A and/or B” should be understood to refer to “A, B, and both A and B”.

*In reference drawings for describing exemplary embodiments of the present disclosure, size, height, thickness, etc. are intentionally exaggerated for convenience of description and ease of understanding, but are not enlarged or reduced according to a ratio. Also, in the drawings, some elements may be intentionally reduced, and other elements may be intentionally enlarged.

Unless otherwise defined, all terms used herein have the same meaning as commonly understood by those of ordinary skill in the art to which this invention pertains. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

FIG. 1 is a schematic diagram for explaining a sound data processing system according to an embodiment of the present disclosure. Referring to FIG. 1, a sound data processing system 10 according to an embodiment of the present disclosure includes a plurality of terminals 100A, 100B, and 100C and a server 200. Each of the plurality of terminals may be referred to as a sound collecting terminal or a sound providing terminal according to the embodiment implementing a sound data processing system.

The plurality of terminals 100A, 100B, and 100C communicate with the server 200 through a network N. The terminals 100A and 100C including a sound collecting means transmit position data corresponding to positions at which the terminals 100A and 100C are located and orientation direction data corresponding to directions in which the sound collecting means are oriented to the server through the network. The terminals 100A and 100B including a sound providing means transmit position data corresponding to positions at which the terminals 100A and 100B are located and orientation direction data corresponding to directions in which the sound providing means are oriented to the server through the network. The terminal 100A including both the sound proving means and the sound collecting means may exist, and the terminal 100A may transmit the position data corresponding to the position thereof and the orientation direction data corresponding to an orientation direction of the sound collecting means to the server.

Each of the terminals may be fixed at a fixed position or freely move. The orientation directions of the sound collecting means and/or the sound providing means included in each of the terminals may be fixed or vary. In the present embodiment, whether the terminal moves and whether the orientation direction is fixed is not a problem, and the position data and orientation direction data of the sound collecting means and/or the sound providing means included in each of the terminals may be provided to the server.

The terminals 100A and 100C including the sound collecting means provide sound data corresponding to a sound collected by the sound collecting means to the server 200 through the network N. The terminals 100A and 100B including the sound providing means are provided with sound data corresponding to a sound to be provided to the sound providing means through the network. The sound data refers to data that can restore a corresponding sound and is not limited to a format in regards to whether the sound data is analog or digital data and whether the sound data is compressed or non-compressed.

The server 200 receives the position data and the orientation direction data of the sound collecting means and/or the sound providing means which are provided by the plurality of terminals. According to an embodiment, the server 200 may receive the sound data corresponding to the sound collected from each of the terminals 100A and 100C including the sound collecting means, and determine a position of a source that produces the sound using the position data, the orientation direction of the sound collecting means, and the like. According to an embodiment, the server 200 may transmit sound data to the terminals 100A and 100B located at specific positions and which include the sound providing means having specific orientation directions to provide sound corresponding to the sound data, if necessary.

The network N is a network through which the sound data, the position data, the orientation direction data, and the like can be transmitted between the server 200 and the terminals 100A, 100B, and 100C. According to the present embodiment, the network N is not limited to kinds of networks such as a wired network or a wireless network.

Figure 2:
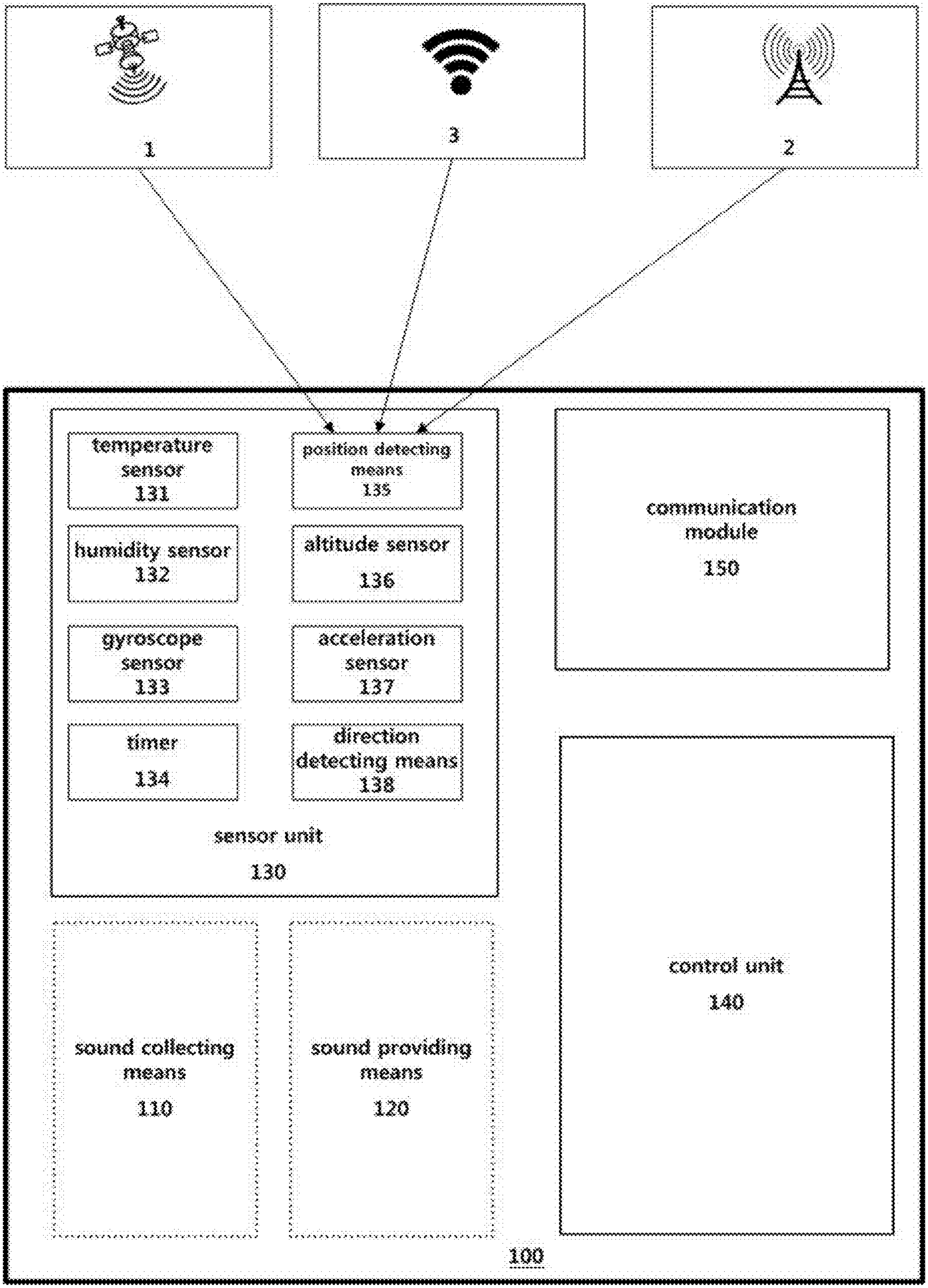
FIG. 2 is a block diagram schematically illustrating a structure of a terminal.

FIG. 2 is a block diagram schematically illustrating a structure of a terminal. Referring to FIG. 2, a terminal 100 may include a sound collecting means 110, a sound providing means 120, a sensor unit 130, a control unit 140, and a communication module 150. According to an embodiment, the terminal 100 may include both the sound collecting means 110 and the sound providing means 120, or any one of the sound collecting means 110 and the sound providing means 120.

The sound collecting means 110 collects sound generated by a source and converts the collected sound into an electrical signal. As an example, the sound collecting means may be implemented as a microphone, and a condenser microphone, a dynamic microphone, a ribbon microphone, a carbon microphone, a piezoelectric microphone, a micro electro mechanical system (MEMS) microphone, and other microphones which are not described here may be used as the sound collecting means.

The sound providing means 120 receives sound data and forms sound corresponding to the sound data to provide the formed sound to the outside. As an example, the sound collecting means may be implemented as a loudspeaker and used regardless of frequencies of output sound of a woofer speaker, a tweeter speaker, or the like. It is sufficient for the sound providing means to provide sound regardless of the type of a speaker unit.

The terminal 100 includes the sensor unit 130. The sensor unit may include sensors such as a temperature sensor 131, a humidity sensor 132, a gyroscope sensor 133, a timer 134, a position detecting means 135, an altitude sensor 136, an acceleration sensor 137, a geomagnetic sensor 138, and the like, as shown in the drawings. The sensors shown in the drawings are merely examples and may further include other sensors such as an ultrasonic sensor and an infrared sensor according to embodiments. In addition, the terminal may not include any one or more of the sensors shown.

According to an embodiment, when it is desired for the sound collecting means to determine a position of a source producing a sound, it may be necessary to measure an amplitude attenuation ratio of the sound. Since the amplitude attenuation ratio of the sound varies according to a propagation distance as a temperature and an atmospheric condition change, the terminal may transmit a temperature measured by the temperature sensor, a humidity measured by the humidity sensor, an altitude measured by the altitude sensor, an atmospheric pressure corresponding to the altitude, and the like to the server.

The position detecting means 135 may communicate with a Global Positioning System (GPS), a GLObal NAvigation Satellite System (GLONASS), and a navigation satellite 1 such as Galileo to determine a current position of the terminal. The position detecting means 135 may determine the position of the terminal using a triangulation method by using mobile communication base stations 2. In addition, the position detecting means 135 may determine the position of the terminal using Wi-Fi. The terminal 100 transmits position data corresponding to the position of the terminal detected by the position detecting means 135 through the network.

The timer 134 may form time data and transmit the time data to the server. However, when the position detecting means 135 acquires current time information in addition to the current position of the terminal by communicating with the navigation satellite 1 or a mobile communication base station, the terminal may not include the timer.

The direction detecting means 138 detects an orientation direction. The direction detecting means 138 may measure at least one of an orientation direction of the terminal, an orientation direction of the sound collecting means 110, and an orientation direction of the sound providing means 120. A geomagnetic sensor may be implemented as the direction detecting means 138. The geomagnetic sensor is a sensor for measuring terrestrial magnetism, and can be used to perform functions of a compass measuring an azimuth.

According to an embodiment, both the sound collecting means and the sound providing means have directivity. A collected sound may vary according to an orientation direction of the sound collecting means 110, and intensity of a provided sound may vary according to an orientation direction of the sound providing means 120. Accordingly, the direction detecting means 138 transmits orientation direction data corresponding to the orientation directions of the sound collecting means and/or the sound providing means to the server.

The terminal may measure a tilt thereof using the acceleration sensor 137 or the gyroscope sensor 133 and transmit tilt data corresponding to the tilt. Since a velocity can be obtained by integrating acceleration and a displacement can be acquired by re-integrating the velocity, acceleration or angular acceleration may be detected using the acceleration sensor or the gyroscope sensor 133, and the time information may be acquired using the timer to perform a definite integral during a predetermined period of time, by which the velocity, the angular velocity, or the displacement may be obtained. The terminal 100 may transmit the tilt measured by the acceleration sensor and/or the gyroscope sensor, tile data corresponding to the acceleration and the angular acceleration, and acceleration data and angular acceleration data to the server through the network.

The control unit 140 includes a Central Processing Unit (CPU) and a memory. The control unit 140 converts result detected by the sensor unit 130 to transmit the result through the network, and forms sound data to correspond to the sound collected by the sound collecting means 110. The control unit 140 converts sound data provided by the server to provide the sound data to the outside through the sound providing means 120. The memory (not shown) may store an identifier of the terminal and allow identifier data corresponding to the identifier to be transmitted through the network.

The communication module 150 transmits data corresponding to results detected and collected by the sensor unit 130 and the sound collecting means 110 to the server through the network, or receives data from the server. As described above, it is sufficient for the network to allow data to be transmitted to and received from the server, and it is also sufficient for the communication module 150 to transmit and receive data through the network to correspond to the network.

As one implementation example, the terminal 100 may be implemented as a smartphone or a tablet. As another implementation example, the terminal 100 may include at least one of the sound collecting means 110 and the sound providing means 120 and be implemented as a dedicated terminal including the sensors included in the sensor unit.

Figure 3:
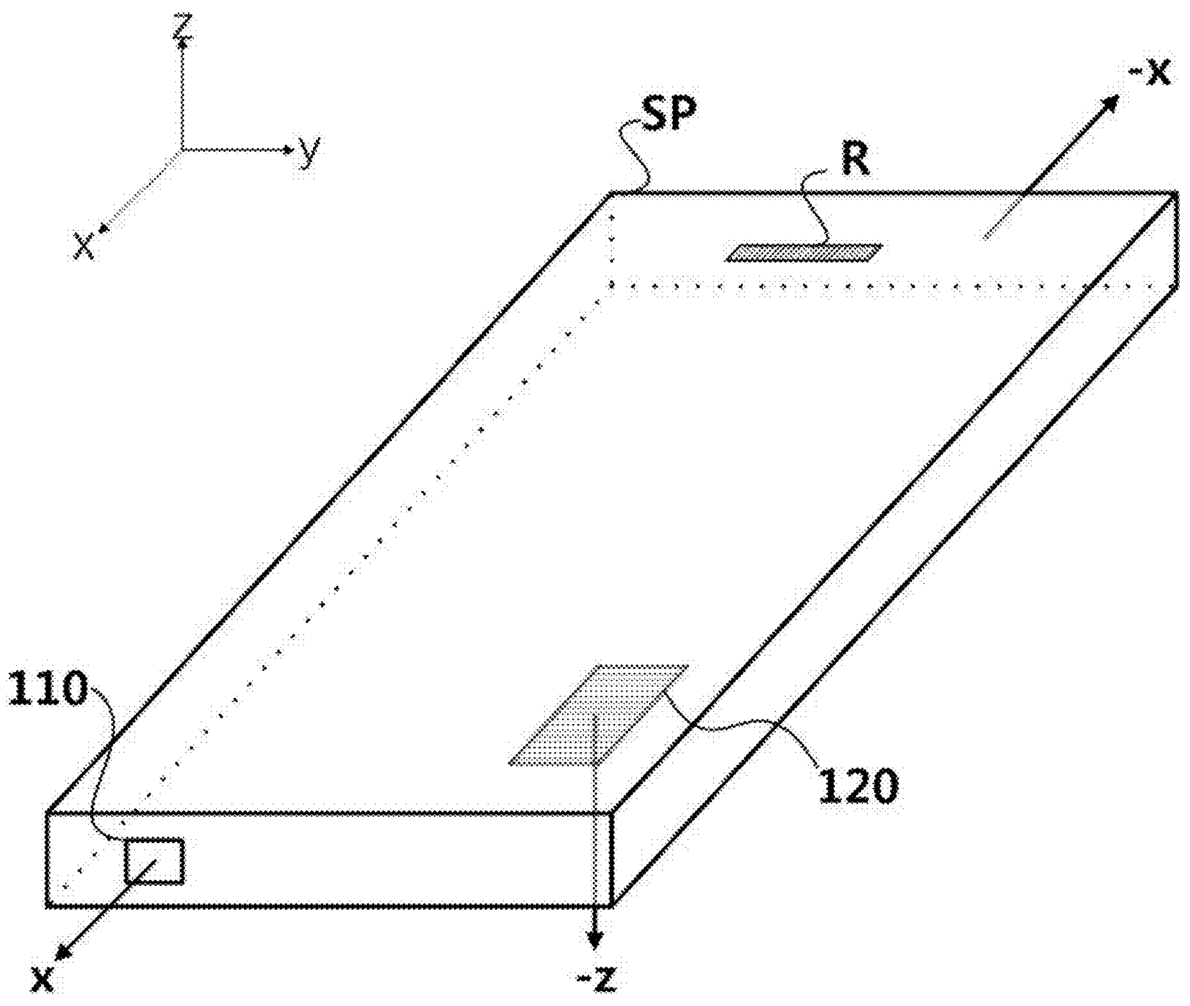
FIG. 3 is a diagram illustrating a case in which a terminal is implemented as a smartphone.

FIG. 3 is a diagram illustrating a case in which a terminal is implemented as a smartphone. When the terminal is implemented as a smartphone SP, a direction detecting means included in the smartphone may detect a −x direction, which is a direction in which a speaker R is located in a longitudinal direction of the smartphone, to be an orientation direction of the terminal. However, an orientation direction of the sound collecting means 110 is an x direction, and an orientation direction of the sound providing means 120 is a −z direction.

The orientation directions of the sound collecting means 110 and the sound providing means 120 are unified for each smartphone terminal model or tablet model. When storing whether the sound collecting means and/or the sound providing means is included for each terminal model and orientation direction data thereof, the server may receive identification data of the terminal and orientation direction data detected and transmitted by the direction detecting means to determine the orientation direction data of the sound collecting means 110 and/or the sound providing means included in the smartphone terminal and/or the tablet from the received data.

The orientation direction data used in the present specification includes both data formed by the direction detecting means directly detecting orientation directions of the sound collecting means and the sound providing means, and data about the orientation direction of the terminal and the orientation directions of the sound collecting means and/or the sound providing means obtained on the basis of identification data stored in the server.

Referring back to FIG. 2, the terminal transmits supplementary data including data corresponding to values detected by the sensors included in the sensor unit 130 as well as sound data corresponding to sound collected by the sound collecting means to the server through the network N. The supplementary data may include position data corresponding to a current position of the terminal detected by a position detecting means and orientation direction data of the sound collecting means 110 and the sound providing means 120 detected by the direction detecting means 138, and may also include identification data, temperature data, and humidity data of the terminal through which progress and current statuses of the sound collecting means and the sound providing means can be determined.

A sound collecting terminal may be disposed at a specific place to fix the orientation direction of the sound collecting means. In this case, the supplementary data including the position data and the orientation direction data may be transmitted only when an initial sound collecting terminal is disposed. Unlike the above description, the supplementary data including the position of the sound collecting terminal and/or the orientation direction of the sound collecting means may be changed over time. The supplementary data may be periodically transmitted over time, transmitted whenever the position and/or the orientation direction is changed, or intermittently transmitted. In addition, the supplementary data may be transmitted to the server when there is a request from the server.

Figure 4:
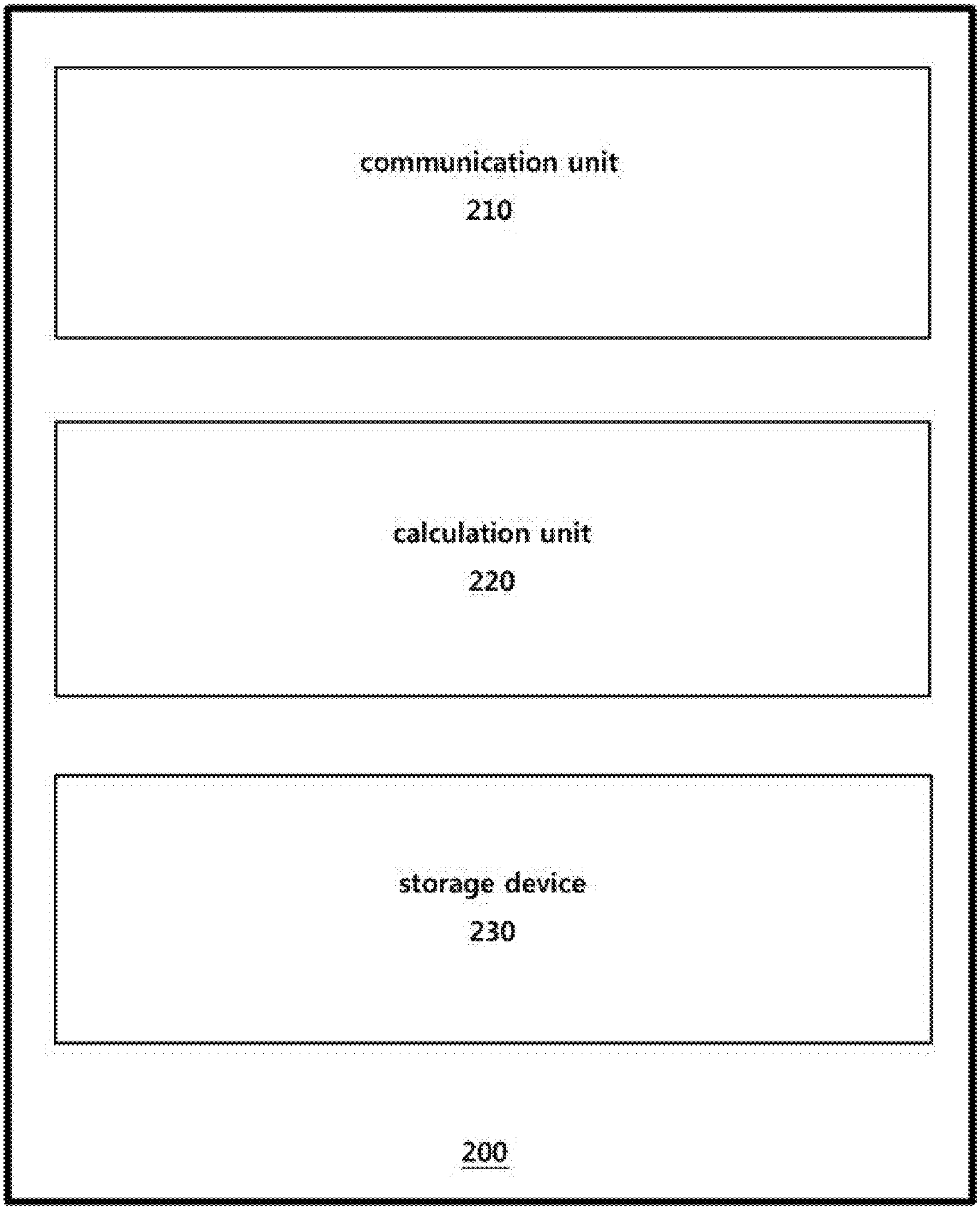
FIG. 4 is a schematic block diagram illustrating a server according to an embodiment of the present disclosure.

FIG. 4 is a schematic block diagram illustrating the server 200 according to an embodiment of the present disclosure. Referring to FIG. 4, the server 200 includes a communication unit 210, a calculating unit 220, and a storage device 230. The communication unit 210 receives the sound data and/or the supplementary data provided by the terminals from the network, and transmits the sound data or the like to the terminal through the network.

The storage device 230 stores the sound data and supplementary data provided by the terminal and stores data, such as the sound data, to be provided to the terminal. The storage device 230 may store position and orientation direction information of the sound collecting means and/or the sound providing means according to an identification number of the terminal.

The calculating unit 220 performs necessary operations such as determining a position of a source that provides the sound collected by the terminal using the sound data and the supplementary data provided from the terminal or forming an attenuation sound signal for attenuating the sound provided by the source. More details will be explained in the following embodiments.

First Embodiment

Figure 5:
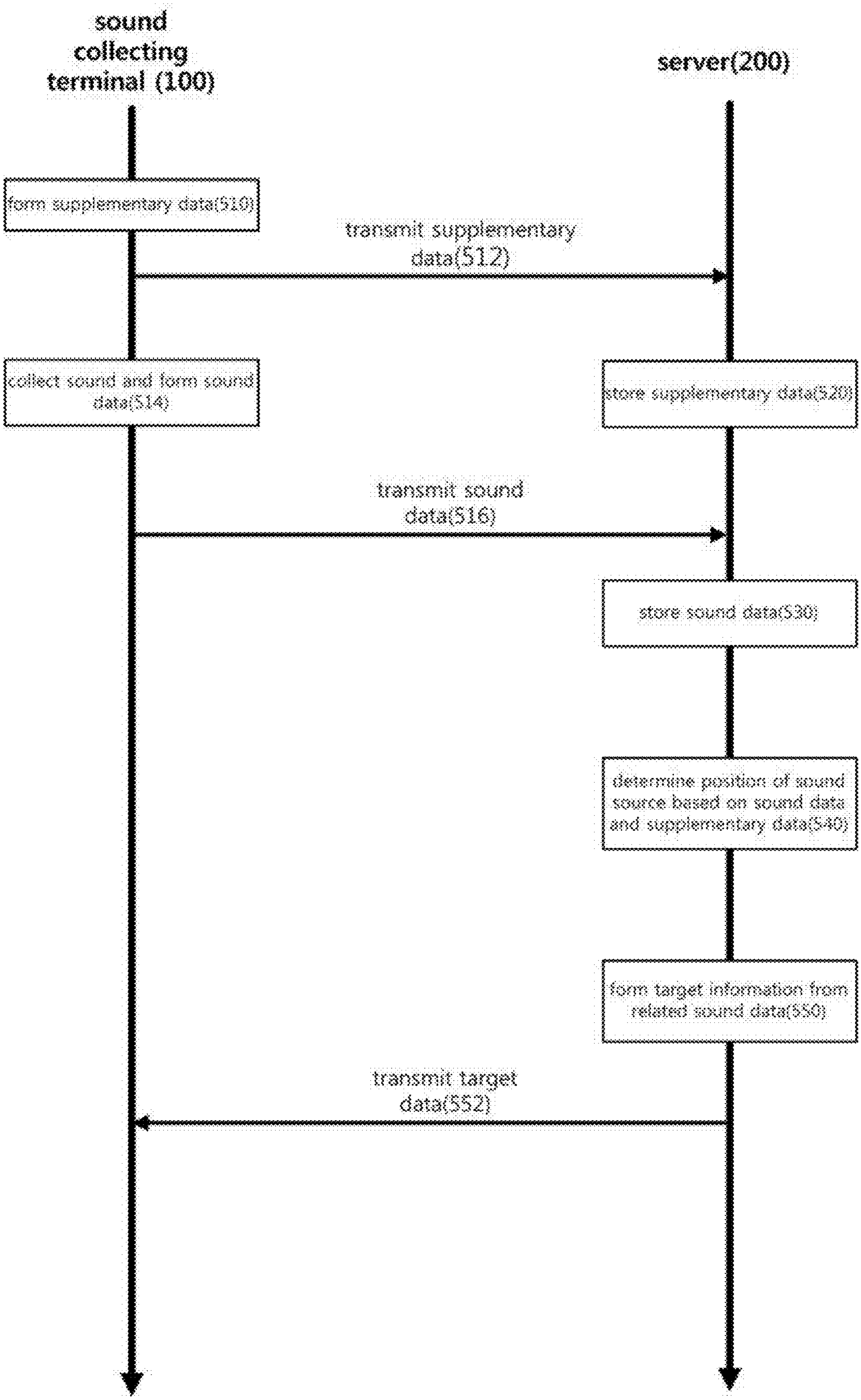
FIG. 5 is a flowchart illustrating a flow of information in a case in which a sound data processing system according to an embodiment of the present disclosure is implemented as a sound source position determining system.

FIG. 5 is a flowchart illustrating a flow of information in a case in which a sound data processing system according to an embodiment of the present disclosure is implemented as a sound source position determining system. In the present embodiment, terminals are sound collecting terminals including a sound collecting means. Referring to FIG. 5, the sound collecting terminals form supplementary data including position data and orientation direction data in operation 510, and transmit the formed supplementary data to a server in operation S512. As described above, when the terminal is a smartphone or a tablet, the supplementary data may further include terminal identification data. Although not shown, the supplementary data may be transmitted with sound data, or the terminal may provide the supplementary data to the server in response to a request from the server. The server 200 stores the transmitted supplementary data in a storage device (see, reference numeral 230 of FIG. 4) in operation S520.

Each of the sound collecting terminals 100 collects sound using the sound collecting means to form sound data in operation 514, and transmits the formed sound data to the server 200 through a network in operation 516. The server 200 stores the sound data transmitted by the sound collecting terminal 100 in a storage device of the server.

Figure 6:
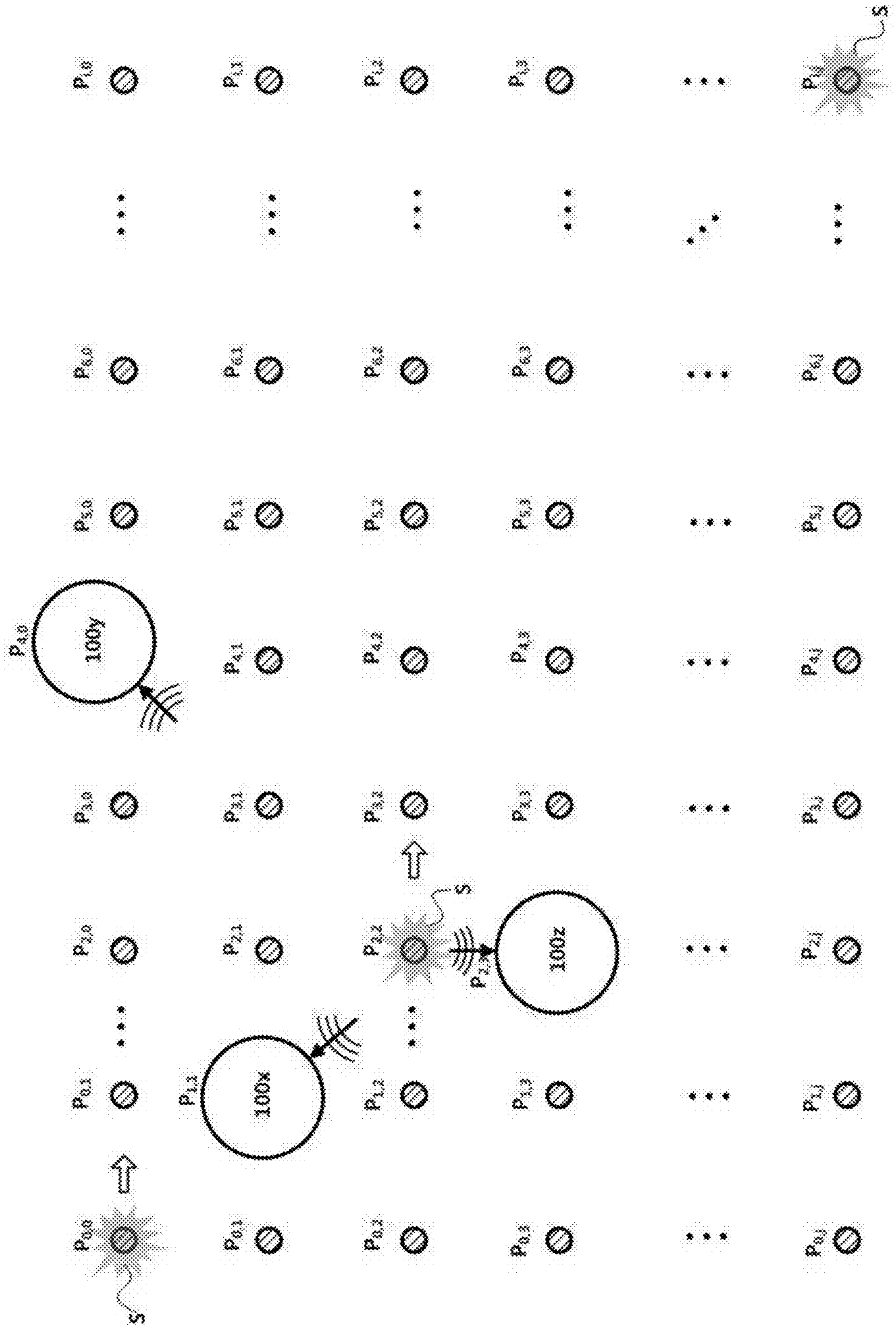
FIG. 6 is a diagram illustrating an embodiment of a method in which a calculating unit of a server determines a position of a sound source.

The server determines a position of a source of the sound collected and transmitted by the sound collecting terminals on the basis of the supplementary data and the sound data in operation S540. FIG. 6 is a diagram illustrating an embodiment of a method in which the calculating unit 220 of the server determines a position of a sound source. Referring to FIG. 6, the calculating unit assumes a region partitioned into a lattice shape, and places sound collecting terminals 100*x*, 100*y*, and 100*z* in the region. Positions and orientation directions in which the sound collecting terminals are disposed are based on supplementary data transmitted by the sound collecting terminals.

The calculating unit 220 calculates intensity of a sound collected by each of the sound collecting terminals 100*x*, 100*y*, and 100*z* while a source S emitting the sound is moving along lattice points $P_{0,0}$, $P_{0,1}$, . . . , $P_{i,j}$ in the region. According to an embodiment, the calculating unit calculates the intensity of the sound collected by the sound collecting terminal based on a distance between the source and the sound collecting terminal. However, when the source S is positioned at $P_{0,0}$, the sound collecting means of the terminal 100*x* is oriented in a direction opposite the source. A distance between the terminal 100*x* and the source when the source S is positioned at $P_{2,2}$ is the same as that when the source S is positioned at $P_{0,0}$, but the sound collecting means is oriented toward the source. In these two cases, although the sound collecting terminal is spaced apart from the source by the same distance, the sound is not collected at the same volume so that it is necessary to correct a difference in a collection volume according to the orientation direction.

The calculating unit multiplies a weighting function $f_\theta$, which applies a weight differently according to the orientation direction, by the intensity of the sound collected by the sound collecting terminal to calculate and correct the collection volume according to the orientation direction. As an example, the weighting function $f_\theta$ may be a function of an angle θ between a straight line connecting the source and the sound collecting terminal and the orientation direction of the sound collecting means.

It is assumed that the source S is positioned at $P_{i,j}$, intensities of a sound collected by each of N sound collecting terminals are calculated as being $Sim_{1,(i,j)}$, $Sim_{2,(i,j)}$, $Sim_{3,(i,j)}$, . . . , $Sim_{N,(i,j)}$, and intensities of a sound actually collected for each of the sound collecting terminals are calculated as being $Col_{1,(i,j)}$, $Col_{2,(i,j)}$, $Col_{3,(i,j)}$, . . . , $Col_{N,(i,j)}$. The calculating unit calculates errors between the intensities of the sound calculated and collected by the sound collecting terminals and the intensities of the sound actually collected whenever the source is positioned at each of the lattice points. The calculating unit 220 calculates a Root Mean Square (RMS) for each of the errors and determines a position at which the smallest value is obtained among the calculated results to be the position of the source.

According to an embodiment, the calculating unit 220 calculates the following Equation 1, and determines a lattice point at which the smallest value $E_{i,j}$ is obtained among calculated values $E_{i,j}$ within the lattice to be the position of the source.

$$E_{i,j} = \sqrt{\frac{1}{N}\left(\sum_{k=1}^{N} (Col_{k,(i,j)} - f_k(\theta)\cdot Sim_{k,(i,j)})^2\right)} \quad \text{[Equation 1]}$$

N: the number of sound collecting terminals, $f_{(\theta)}$: a weighting function According to an embodiment, in a process of determining the position of the source, the intensity of the sound collected by the sound collecting means may be corrected using sensitivity of the sound collecting means included in the terminal. The storage device may store information about the sensitivity of the sound collecting means for each terminal. In addition, the storage device may store data about a sensitivity change regarding a change in the angle between the straight line connecting the sound collecting means and the source and the orientation direction of the sound collecting means for each terminal.

When the terminals transmit the identification information as supplementary data, the server may acquire the sensitivity of the sound collecting means stored in the storage device using the identification information of the terminals, and correct the intensity of the sound collected by the sound collecting means using the acquired sensitivity.

Figure 7:
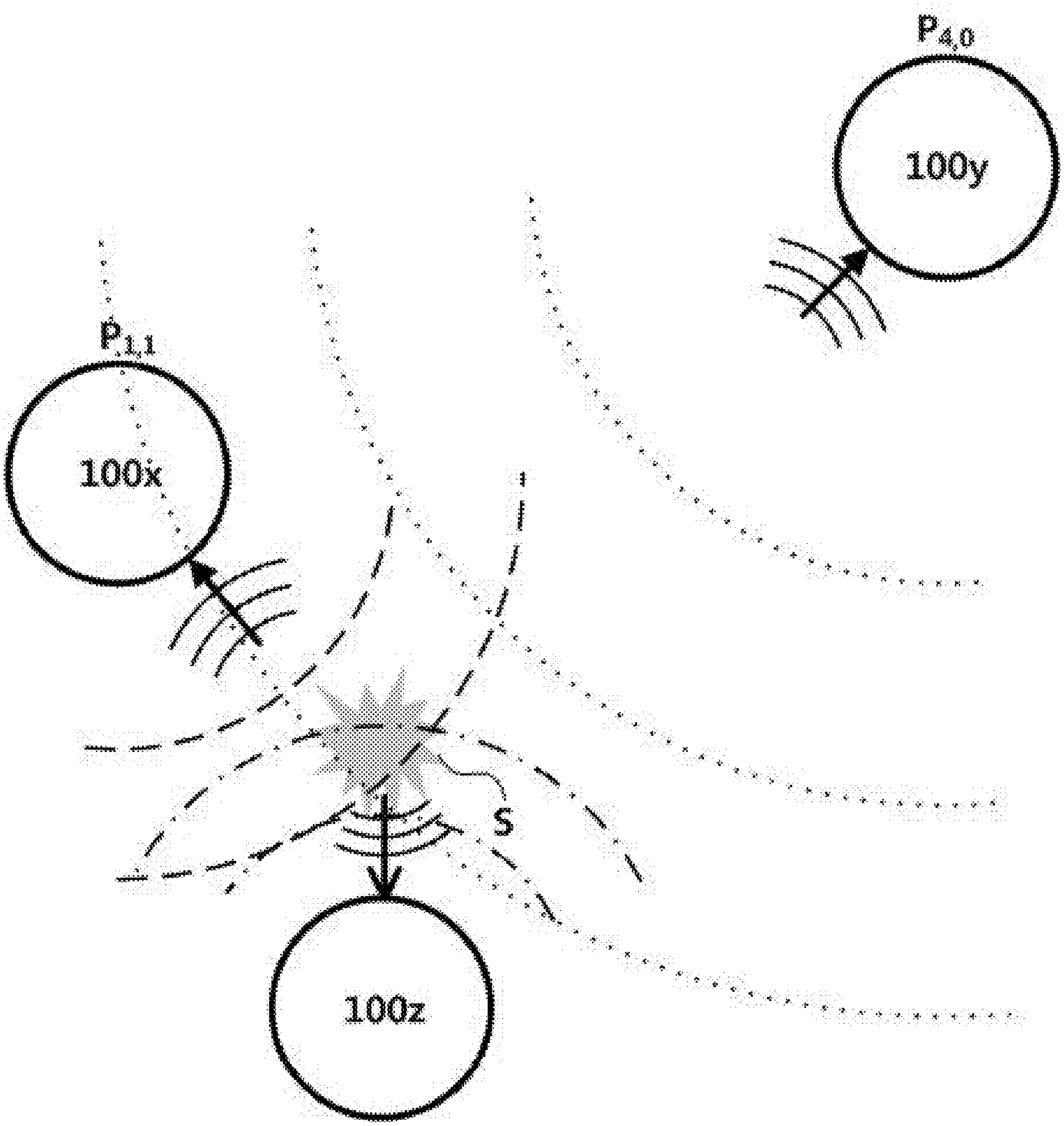
FIG. 7 is a diagram illustrating another embodiment of determining a position of a sound source.

FIG. 7 is a diagram illustrating another example of determining a position of a sound source. Referring to FIG. 7, the calculating unit 220 analyzes amplitudes of sound data collected by the sound collecting terminals 100*x*, 100*y*, and 100*z*, and forms an equal amplitude region having a constant amplitude for each of the sound collecting terminals. The calculating unit forms the equal amplitude region in consideration of an orientation direction of a sound collecting means when forming the equal amplitude region. When the formed equal amplitude regions are extended to overlap each other, an area in which all equal amplitude regions overlap each other may be obtained, and a corresponding area may be determined to be a position of the source S.

The embodiments disclosed above describe the source as providing a sound and the sound collecting terminals as being arranged on the same two-dimensional plane, but this is merely for simplicity and clarity of explanation. That is, the source providing the sound and the sound collecting terminals may be located freely within a three-dimensional space.

According to an embodiment, the calculating unit 220 may determine a position of the sound source S, determine an amplitude type and/or a frequency of a sound, and determine whether the amplitude type and frequency of the sound correspond to a predefined amplitude type and frequency to provide information. As an example, when the determined amplitude type is a type of a Dirac-Delta function, it can be determined that an impact event such as an explosion or gunfire has occurred. As another example, when the frequency of the sound coincides with or corresponds to a frequency generated from gunfire or an explosion of an explosive, determined impact events may be characterized as a singular event forming a sound with a large amplitude in a very short time. Such impact events may be an explosion, gunfire, etc., as illustrated.

When an impact event is detected, it is possible to determine a magnitude of the impact from supplementary data in which a vibration is detected by an acceleration sensor (see reference numeral 137 of FIG. 2) and a gyroscope sensor (see reference numeral 133 of FIG. 2) included in a sensor unit (see reference numeral 130 of FIG. 2) of the terminal in operation S550.

When it is determined that an impact event is generated, the calculating unit 220 may transmit information about the impact event including the position of the sound source to terminals within a certain distance from the position of the source in operation S552.

Second Embodiment

Figure 8:
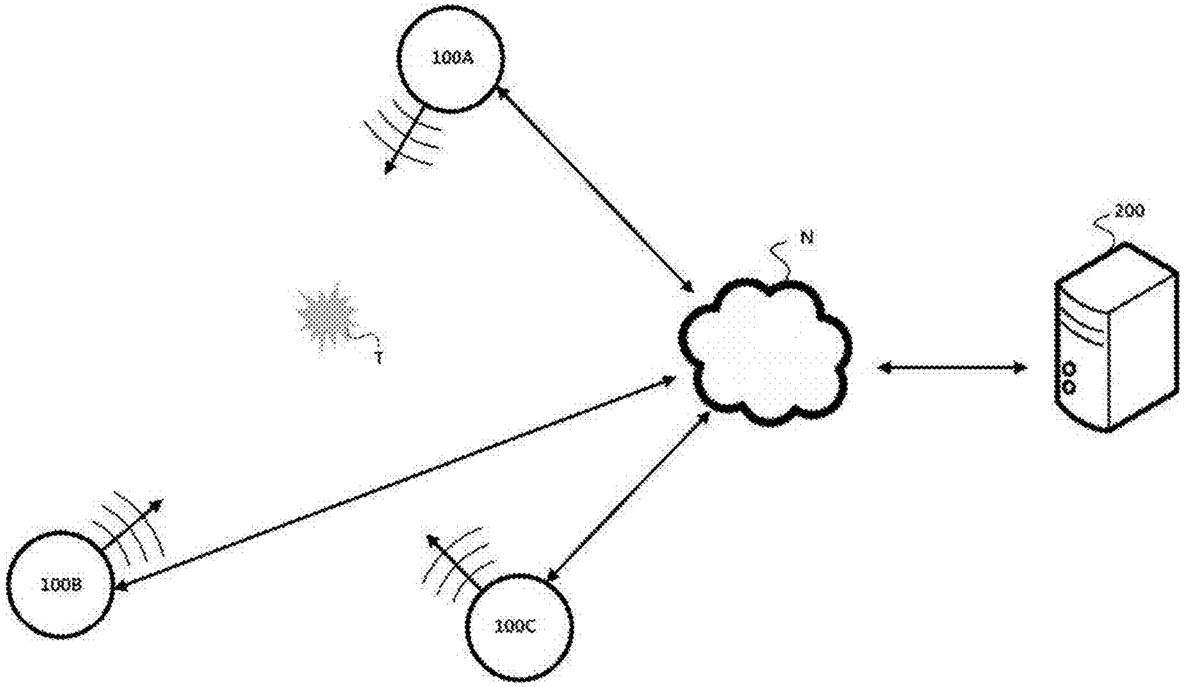
FIG. 8 is a schematic diagram illustrating a case in which a sound data processing system according to an embodiment of the present disclosure is implemented as a sound removing system.
Figure 9:
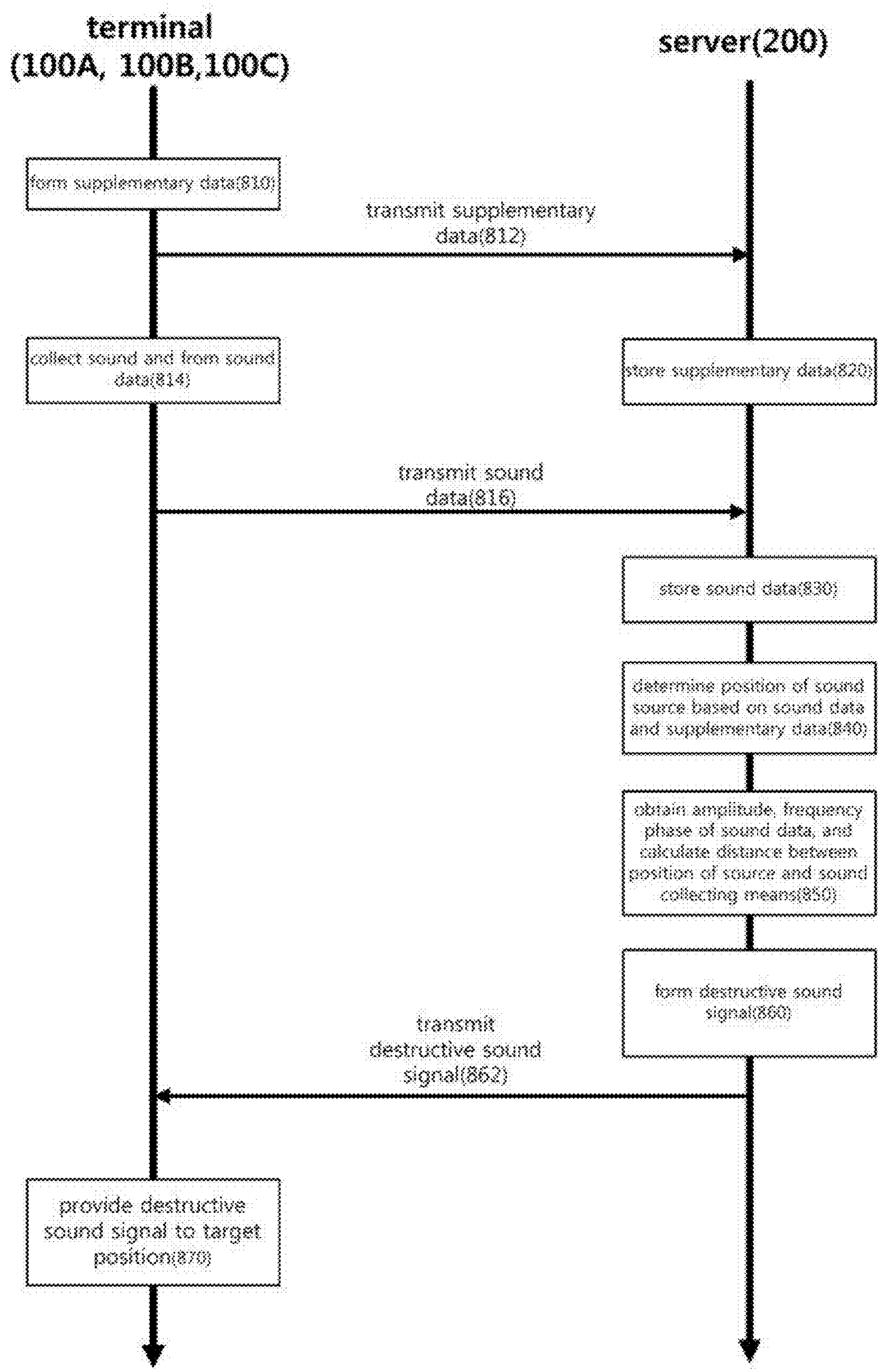
FIG. 9 is a flowchart illustrating a flow of information in a case in which a sound data processing system according to an embodiment of the present disclosure is implemented as a sound removing system.

FIG. 8 is a schematic diagram illustrating a case in which a sound data processing system according to an embodiment of the present disclosure is implemented as a sound removing system, and FIG. 9 is a flowchart illustrating a flow of information in a case in which a sound data processing system according to an embodiment of the present disclosure is implemented as a sound removing system. In the present embodiment, terminals indicated by 100A, 100B, and 100C are terminals including a sound collecting means and a sound providing means, and an orientation direction of the sound collecting means and an orientation direction of the sound providing means may be the same for each of the terminals. When describing the present embodiment, descriptions of the same or similar parts to those of the above-described embodiments may be omitted for the sake of brevity and clarity.

Referring to FIGS. 8 and 9, the terminals 100A, 100B, and 100C form supplementary data including position data of the terminals and orientation direction data of the sound collecting means and the sound providing means in operation 810, and transmit the formed supplementary data to a server in operation S812. As described above, the supplementary data may be transmitted when there is a change in the position of the terminal and the orientation direction of the sound collecting means and/or the sound providing means included in the terminal, intermittently transmitted, or provided according to a request from the server. The server 200 receives the supplementary data and stores the received supplementary data in a storage device (see reference numeral 230 of FIG. 4) in operation S820.

The terminals 100A, 100B, and 100C collect a target sound, which is a sound to be offset, and form sound data corresponding to the target sound in operation 814, and transmit the sound data to the server in operation S816. The server 200 receives the sound data and stores the received sound data in the storage device in operation S830. The calculating unit (see reference numeral 220 of FIG. 4) determines a target position T, which is the position of a source emitting the sound, by using the sound data and/or the supplementary data in operation S840.

Figure 10:
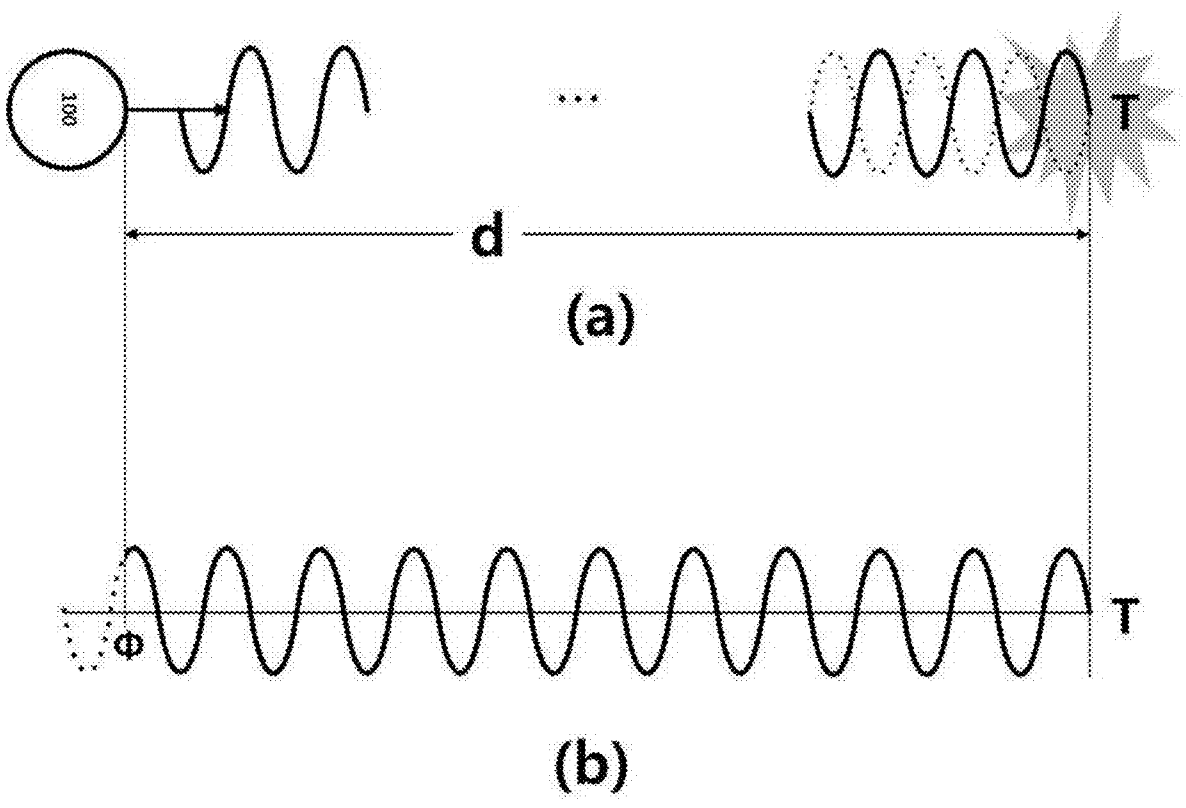
FIG. 10 is a schematic diagram illustrating a relationship between a distance and a phase for providing an attenuation sound signal having an anti-phase in a target position.

In the present embodiment, when attenuation of the target sound shown by dotted lines at the target position T to erase the sound as shown in FIG. 10A, destructive sound (solid lines) having the same frequency as that of the target sound and having an anti-phase is provided so that the target sound and the destructive sound destructively interfere with each other. Accordingly, the destructive sound signal having the same frequency as that of the target sound and the anti-phase should be provided to the target position T. FIG. 10A illustrates only a case in which the target sound has one frequency, but the target sound may have one frequency and include sounds of several frequency bands. When the target sound includes the sounds of several frequency bands, the calculating unit may determine the frequency included in the target sound by driving a Fast Fourier Transform (FFT) module capable of determining the frequency band.

However, in order to provide the destructive sound signal having the anti-phase to the target position T, a distance d between the terminal 100 and the target position T should be determined as shown in FIGS. 10A and 10B, and a phase of a sound provided by the terminal should be adjusted according to the determined distance.

The calculating unit calculates an amplitude, frequency, and phase of the sound by using the sound data corresponding to the target sound stored in the storage device, and calculates a distance difference between the source providing the sound and the terminal providing the destructive sound signal in operation S850. The calculating unit forms the destructive sound signal having the frequency obtained from the sound data and a phase 1, which causes destructive interference to occur at a target point, for each of the terminals. The calculating unit calculates an amplitude of an attenuation sound to attenuate the target sound according to the distance between the sound providing terminal and the target position. When an attenuation sound having an amplitude excessively larger than the sound providing terminal and the target position is generated, the target sound may be attenuated but the attenuation sound may be propagated. Conversely, when an attenuation sound having an amplitude excessively smaller than the sound providing terminal and the target position is formed, the target sound may not be attenuated. Accordingly, the calculating unit calculates an amplitude corresponding to the distance between the sound providing terminal and the target position.

According to an embodiment, the storage device (see reference numeral 230 of FIG. 4) may store changes in sound providing efficiency according to changes in a sound providing output, position, and orientation direction of the sound providing means for each of the terminals. The sound providing output of the sound providing means refers to an output capable of providing a sound, and may be typically measured as an output of a power amplifier included in the sound providing means. Accordingly, higher volume may be provided along with an increase in the sound providing output. The sound providing efficiency refers to a volume ratio of the sound provided to the target position as an angle between a straight line connecting the target position and the sound providing means, and the orientation direction of the sound providing means is changed in a relationship between the orientation direction of the sound providing means and the target position. As an example, the target position to which the sound is to be provided and the sound providing means may be spaced apart from each other by a unit distance. Here, when the angle between the straight line connecting the target position and the sound providing means and the orientation direction of the sound providing means is 45 degrees, a volume provided to the target position may be reduced by −3 db, and when the angle between the straight line connecting the target position and the sound providing means and the orientation direction of the sound providing means is 90 degrees, the volume provided to the target position may be reduced by −6 db. The storage device may store information about a reduction ratio of the volume in regards to the change in the angle between the straight line connecting the target position and the sound providing means and the orientation direction of the sound providing means for each of the terminals.

The calculating unit calculates an amplitude and phase that enables the target sound to be offset in consideration of the output and orientation direction of the sound providing means. The calculating unit forms destructive sound signal data corresponding to the destructive sound signal having the amplitude, frequency, and phase calculated for each of the terminals in operation 860, and transmits the formed destructive sound signal data to the terminals in operation S862. According to an embodiment, the terminal that participates in operation S812 of collecting the sound and transmitting the sound data is a terminal including the sound collecting means, and the terminal that participates in operation 862 of receiving the destructive sound signal data is a terminal including the sound providing means. In another embodiment, the terminal can receive the destructive sound signal data from the server even if the terminal does not include the sound providing means.

The terminal 100 may form the destructive sound signal corresponding to the destructive sound signal data and provide the formed destructive sound signal to the target position so that the target sound is offset. When the target sound is a noise that a user does not want, the present embodiment is utilized as a sound attenuation system to attenuate the unwanted noise.

Third Embodiment

Figure 11:
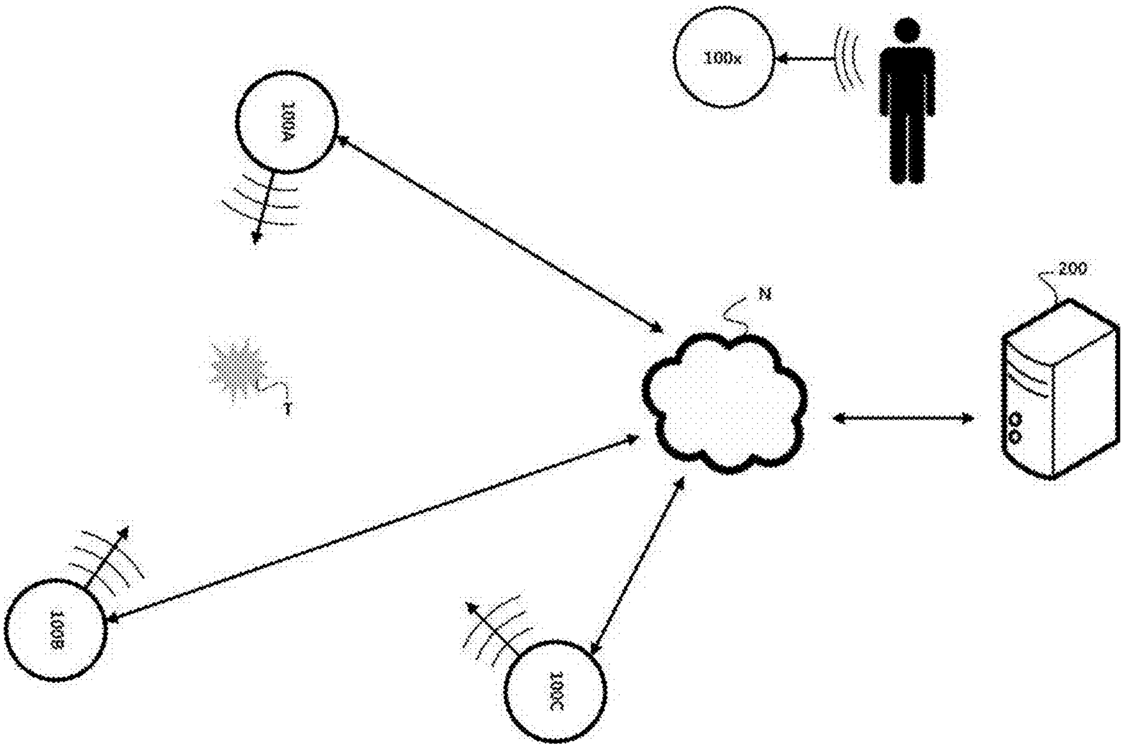
FIG. 11 is a schematic diagram illustrating a case in which a sound data processing system according to an embodiment of the present disclosure is implemented as a public address system or a remote call system.
Figure 12:
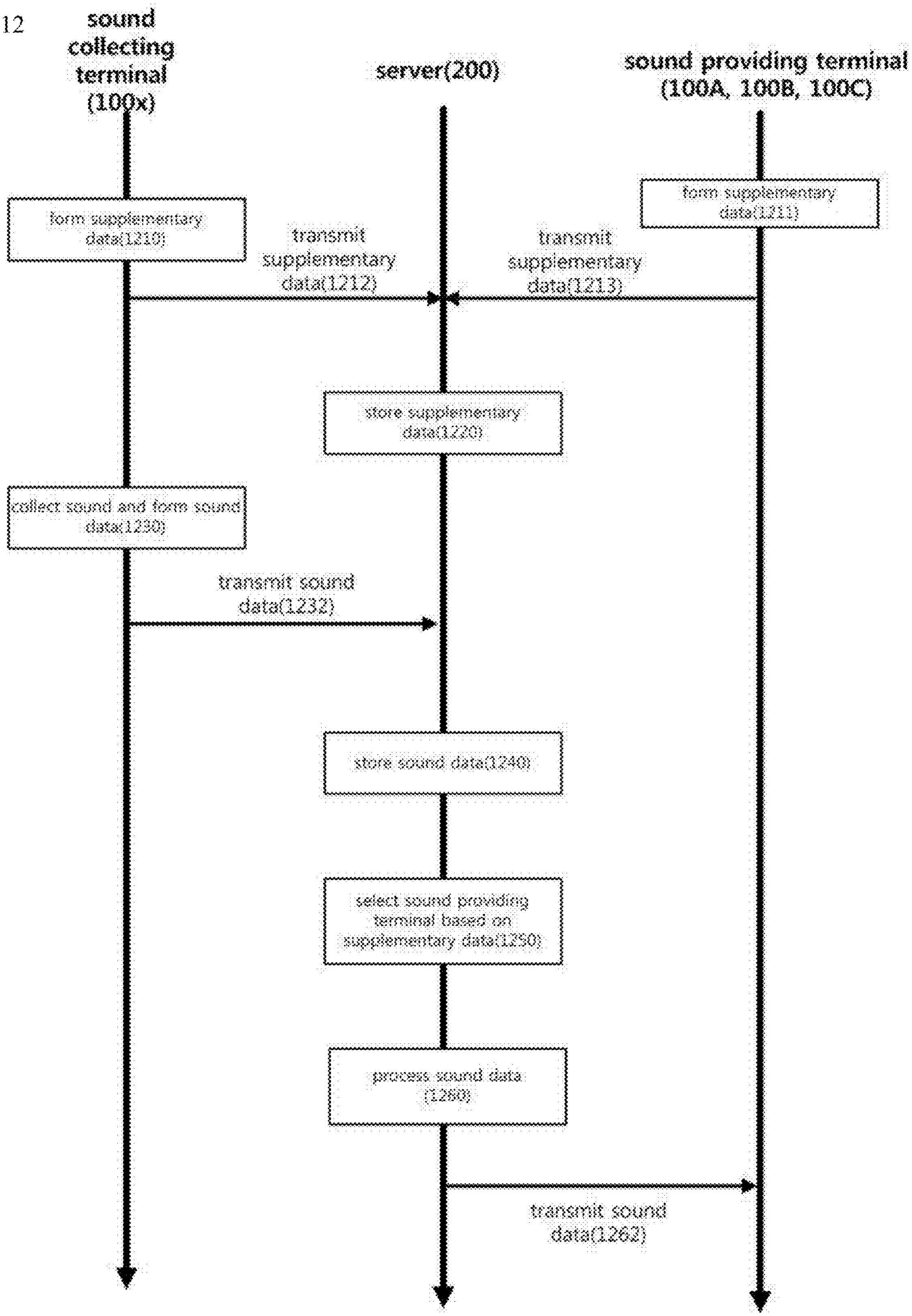
FIG. 12 is a flowchart illustrating a flow of information in a case in which a sound data processing system according to an embodiment of the present disclosure is implemented as a sound removing system.

FIG. 11 is a schematic diagram illustrating a case in which a sound data processing system according to an embodiment of the present disclosure is implemented as a public address system or a remote call system, and FIG. 12 is a flowchart illustrating a flow of information in a case in which a sound data processing system according to an embodiment of the present disclosure is implemented as a sound removing system. In the present embodiment, terminals indicated by 100A, 100B, and 100C are terminals including a sound providing means and are herein referred to as sound providing terminals. In addition, a terminal 100$x$ is a terminal including a sound collecting means and is referred to as a sound collecting terminal. When describing the present embodiment, descriptions of the same or similar parts to those of the above-described embodiments may be omitted for the sake of brevity and clarity.

Referring to FIGS. 11 and 12, the sound collecting terminal 100$x$ and the sound providing terminals form supplementary data in operations S1210 and S1211 and intermittently and periodically transmit the supplementary data to a server through a network in operations S1212 and S1213. Although not shown, the terminal may provide the supplementary data to the server through the network in response to a request from the server. The supplementary data includes position data of the terminal and orientation direction data of the sound collecting means and/or the sound providing means, and also includes identification information of the terminal as described above. Meanwhile, the supplementary data formed by the terminal and transmitted to the server may include a target position T to which a sound to be transmitted by the sound providing terminal should be transmitted.

The sound collecting terminal collects a sound using the sound collecting means, and forms sound data corresponding to the collected sound in operation S1230. The sound collecting terminal 100$x$ transmits the formed sound data to a server 200 through a network N in operation S1232, and the server 200 stores the transmitted sound data in a storage device in operation S1240.

According to the embodiment implementing the remote call system, the sound data is sound data that a user located in a remote place provides to the server through the sound collecting terminal. According to the embodiment implementing the public address system, the sound data is sound data that a user provides using a sound collecting terminal directly connected to the server, or sound data that is stored in advance in the storage device of the server as a ring tone or the like for focusing attention of people in an area to be addressed.

The server 200 determines sound providing terminals located at the target position to which the sound is to be provided based on the supplementary data in operation S1250. As an example, the server 200 may select terminals located within a predetermined distance from the target position T, by using the position data included in the supplementary data. As another example, the server may select a terminal facing the target position by using the orientation direction data included in the supplementary data.

The server 200 processes the stored sound data in operation S1260 and transmits the processed sound data to the sound providing terminal in operation S1262. The above-mentioned processing refers to all processes of receiving and outputting signals such as amplification, attenuation, filtering, compressing signals, etc., regardless of digital and analog signal processing. In the case of the remote call system, as an example of signal processing, only a region corresponding to human voice may be extracted from the sound data and the remaining regions may be removed to reduce a bandwidth of the transmitted sound, and only a main interest band may be transmitted to save resources. As another example, the sound data may be formed, and then the formed sound data may be compressed using a certain compression codec and transmitted.

The server 200 provides the sound data processed in this way to the sound providing terminals 100A, 100B, and 100C in operation S1262. The sound providing terminals 100A, 100B, and 100C that received the sound data provide sound corresponding to the sound data to the target position T. In the embodiment of the public address system, sound provided by a user is processed and provided to the target position. In the embodiment of the remote call system, sound provided by a user U who is a talker is processed and provided to the target position.

As previously described in the previous embodiments, the storage device (see reference numeral 230 of FIG. 4) may store changes in sound providing efficiency according to changes in output and orientation direction of the sound providing means corresponding to identification information of the terminals. Accordingly, the calculating unit calculates at least one of the changes in sound providing efficiency according to the changes in output and orientation direction of the sound providing means by using the identification information included in the supplementary data to calculate at least one of the amplitude, phase, and frequency of the sound provided to the target position.

Fourth Embodiment

Figure 13:
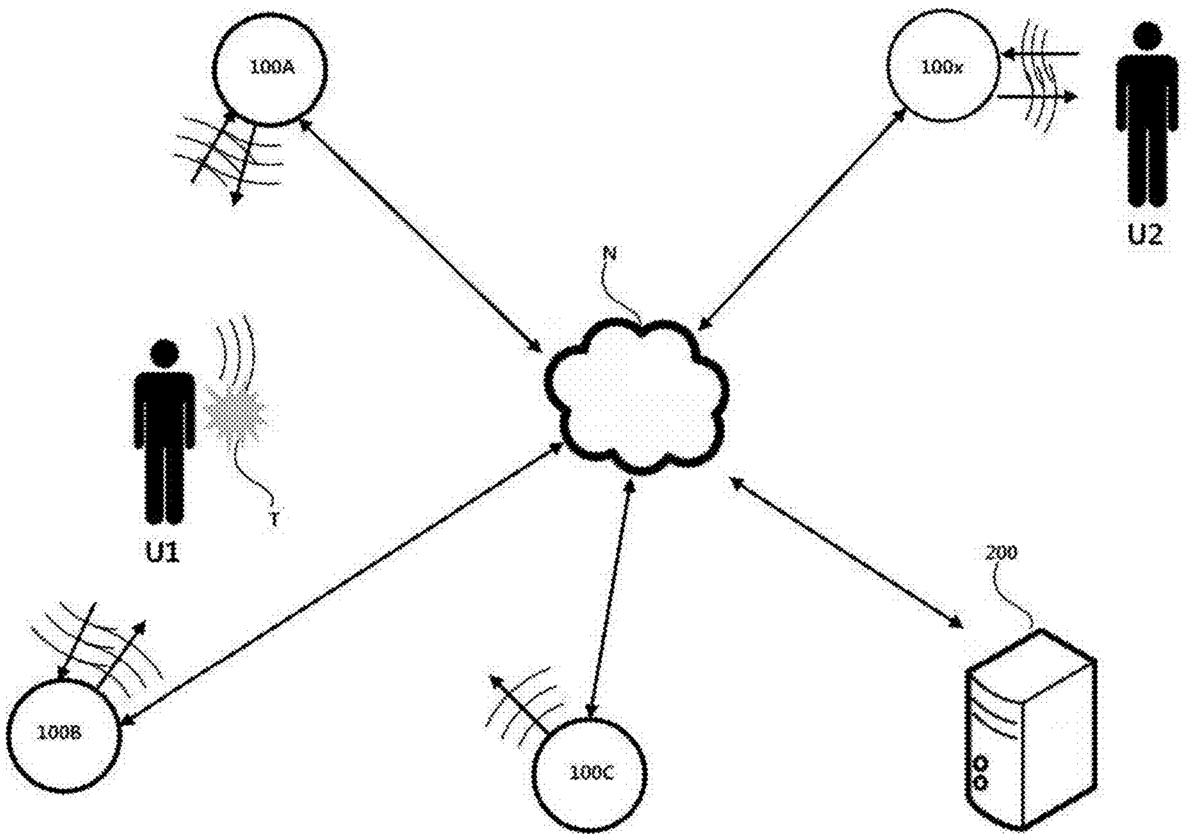
FIG. 13 is a schematic diagram illustrating an outline of a fourth embodiment.

FIG. 13 is a schematic diagram illustrating an outline of a fourth embodiment. The present embodiment is obtained by combining the first embodiment, the second embodiment, and the third embodiment. When describing the present embodiment, descriptions of the same or similar parts to those of the above-described embodiments may be omitted for the sake of brevity and clarity.

It is assumed that a speaker 1 U1 uses a system according to the present embodiment of the present disclosure in a meeting room, which is an environment exposed to noise, and a speaker 2 U2 uses an existing terminal, and the speaker 1 and the speaker 2 are separated from each other.

Noise within the meeting room in which the speaker 1 is located may be offset by implementing the second embodiment of the present disclosure. When the speaker 1 U1 within the meeting room speaks, the terminals 100A, 100B, and 100C collecting a sound provided by the speaker 1 provide sound data corresponding to the sound to a server. According to the first embodiment of the present disclosure, the server may determine a position of the speaker 1, which is a sound source.

According to the third embodiment, the server transmits the sound data corresponding to the sound collected from the speaker 1 U1 by the terminal, to the speaker 2 through a network, and a terminal 100*x* collects sound data provided by the speaker 2 U2 in response to a conversation of the speaker 1 U1 and transmits the collected sound data to a target position T through the network.

Meanwhile, according to the third embodiment, the target position or area stored by the server is not limited to the position of the sound source determined by the first embodiment. For example, when all participants in the meeting room must be able to hear a corresponding sound, the target position or area may be the entire meeting room. In addition, when the speaker 1 U1 moves, the target position may be changed over time according to the movement of the speaker 1 U1.

Although a few embodiments of the present disclosure have been shown and described, it should be appreciated by those skilled in the art that changes may be made in these embodiments without departing from the principles and spirit of the disclosure, the scope of which is defined in the claims and their equivalents.

INDUSTRIAL APPLICABILITY

Described above

The invention claimed is:

1. A sound data processing system comprising:

a plurality of sound providing terminals; and a sever, wherein each of the plurality of sound providing terminals includes a sound providing means that provides a sound to a target position and has an orientation direction, and a communication module that transmits supplementary data including position data of a current position of a corresponding sound providing terminal and orientation direction data corresponding to the orientation direction of the sound providing means through a network, and receives sound data corresponding to a sound provided by the sound providing means from the network, and the server receives the supplementary data transmitted by the plurality of sound providing terminals through the network, and transmits the sound data through the network so that the sound providing terminals provide the sound to the target position on the basis of the supplementary data, wherein the supplementary data further includes identification information of the sound providing terminal, and the server further includes a storage device that stores at least one of an output of the sound providing means corresponding to the identification information of the terminal and a change in sound providing efficiency in regards to a change in the orientation direction, and wherein the server obtains at least one of the output of the sound providing means and the change in the sound providing efficiency in regards to a change in the orientation direction from the identification information of the sound providing terminal, and determines at least one of an amplitude, phase, and frequency of the sound provided to the target position on the basis of at least one of the obtained output of the sound providing means and the obtained change in the sound providing efficiency in regards to the change in the orientation direction.

2. The sound data processing system of claim 1, wherein each of the sound providing terminals further includes a position detecting means that detects the position of the sound providing terminal, and a direction detecting means that detects the orientation direction of the sound providing means.

3. The sound data processing system of claim 1, wherein each of the sound providing terminals further includes a sound collecting means that collects a sound.

4. The sound data processing system of claim 1, wherein the sound data is stored in the server, provided by any one of the plurality of sound providing terminals through the network, or transmitted directly to the server through the sound collecting means.

5. The sound data processing system of claim 4, wherein the sound data is formed and provided at a remote place from the plurality of sound providing terminals.

6. The sound data processing system of claim 1, wherein the server determines positions of the sound providing terminals from the position data included in the received supplementary data, and determines the orientation direction of the sound providing means included in the sound providing terminal from the orientation direction data included in the received supplementary data, and provides the sound data to a sound providing terminal that is located within a predetermined distance from the target position or faces a region including the target position.

7. The sound data processing system of claim 1, wherein the sound data processing system functions as any one of a remote call system and a public address system.

8. The sound data processing system of claim 1, wherein the supplementary data is transmitted when there is a change in the position or the orientation direction, is intermittently transmitted, or is transmitted when there is a request from the server.

9. The sound data processing system of claim 1, wherein the supplementary data further includes information about the target position.

* * * * *